UNITED STATES PATENT OFFICE.

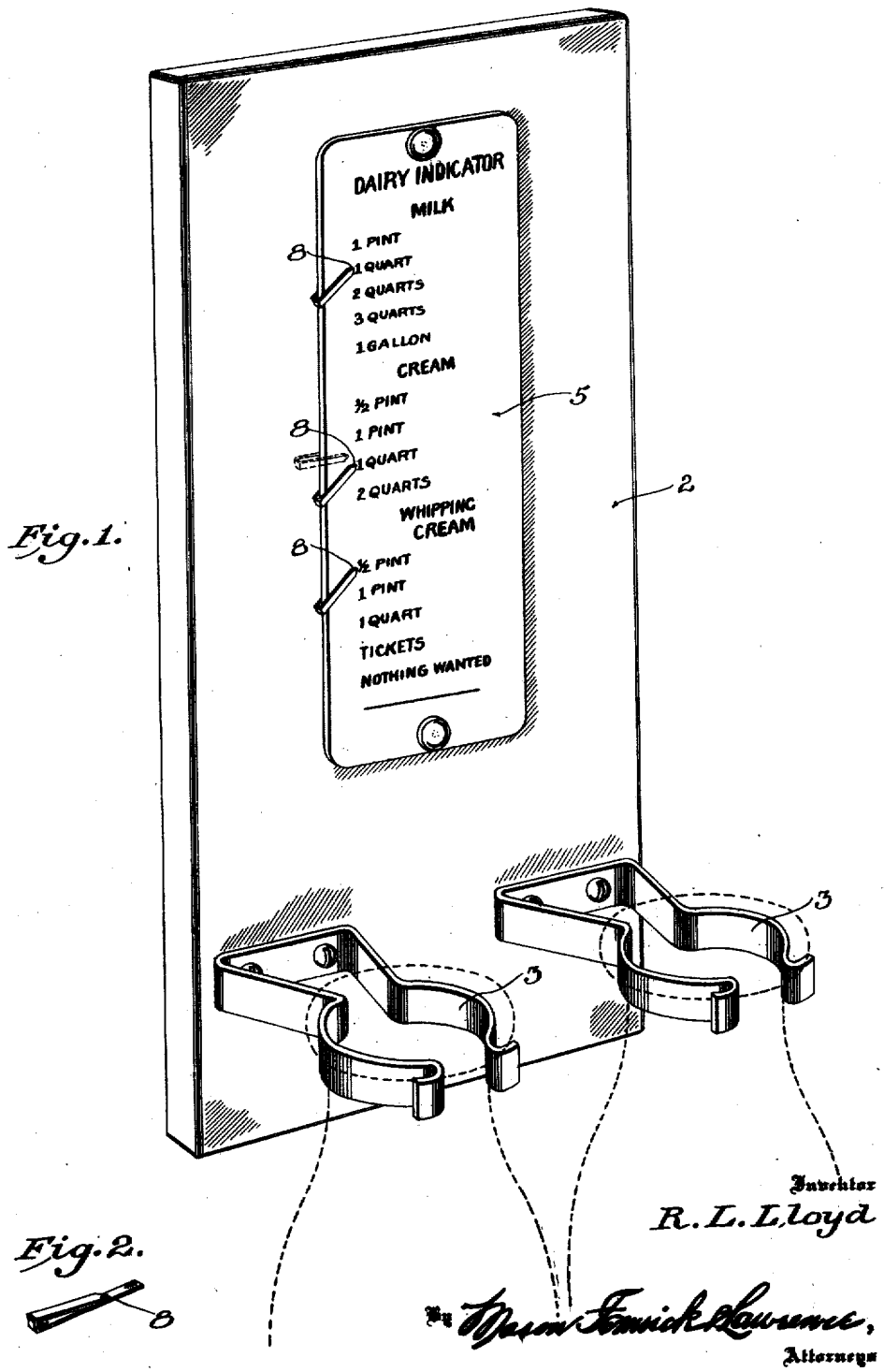

RICHARD L. LLOYD, OF MINNEAPOLIS, MINNESOTA.

HOUSEHOLD DAIRY-INDICATOR.

1,354,983.

Specification of Letters Patent.  Patented Oct. 5, 1920.

Application filed November 12, 1918. Serial No. 262,170.

*To all whom it may concern:*

Be it known that I, RICHARD L. LLOYD, a citizen of the United States, residing at Minneapolis, in the county of Hennepin and State of Minnesota, have invented certain new and useful Improvements in Household Dairy-Indicators; and I do hereby declare the following to be a full, clear, and exact description of the invention, such as will enable others skilled in the art to which it appertains to make and use the same.

This invention relates to means for indicating to merchants and others, such as dairymen for instance, the quantity of such material or merchandise the householder or customer may desire to purchase of the merchant or deliveryman.

An object of this invention is to provide a simple, practicable, inexpensive and readily adjusted indicating device of the nature above referred to and while the device in the present instance is shown as a guide particularly adapted for giving orders for milk, cream and whipping cream, it is obvious that the data may readily be varied according to the requirements of the holder of the device or person having charge of the regulation of the same. It is one of the especial objects of the present invention to provide a device of a kind to enable the householder or other persons to set the indicator at any desirable and convenient time before the arrival of the delivery man so that when he arrives at the house or place of service, he may obtain the information as to the quantity and nature of the material either in the absence of the person ordering or without requiring their presence at the place of delivery.

With these and other objects in view as will be rendered manifest in the following specification, the invention consists of the construction, the combination, and in details and arrangements of the parts more particularly set forth hereinafter relative to the embodiment of the invention, illustrated in the accompanying drawings, in which, Figure 1 is a perspective view of a board having a plurality of milk bottle clamps in juxtaposition to which is shown the indicator.

Fig. 2 is a perspective view of one of the detached adjustable pointers.

The device comprises in the form herein shown an inexpensive piece of board or other suitable material 2 secured upon the front of which there is a suitable number of bottle clamps 3 for the obvious purpose of receiving and holding empty or filled bottles. The board is provided in this case with a card or chart 5 having printed or otherwise produced on its surface a column of words, in the present instance the column being divided into captions, "Milk," "Cream" and "Whipping cream" beneath which words are other words indicative of the quantity into which these substances are ordinarily divided for sale, as for instance, beneath "Milk" is found the words "1 pint," "1 quart," then "2 quarts," "3 quarts," "1 gallon." While at the bottom of the column are also found the words "Nothing wanted." The householder or other person having care of the device who desires to leave instructions simply adjusts one or another or a plurality of the pointers along the edge of the chart or column so as to indicate the quantity of the given commodity desired.

While the indicating pointer may assume various forms and be adjustably fixed to or secured to the chart or indicator in suitable manner in Fig. 2 the pointer is illustrated as comprising a substantially U-shaped spring clip having one of the arms pointed as at 8. This pointer is adapted to be slipped over the edge of the card 5 which will be held thereon by the spring of the arms which are of such length that the bent end of the same projects sufficiently to one side of the card to enable the attendant to readily grasp or finger the same, while the inner ends of the arm frictionally engage the body of the card.

Such a device may be of material value to various office tenants who desire to leave an order or instruction for an expected agent dealing in their respective merchandise or material.

When the transaction or business is conducted between the dealer and his customer through the system of tickets now customary in some localities the word "Tickets" may also be printed upon the chart or indicating board as is shown in the drawings.

It will be seen that by the use of this device the writing of notes which may be misplaced or misunderstood is entirely eliminated and by it the instructions left to the dealer by persons who may not be able to write.

I claim:

An indicating clamp of the type described, comprising a U-shaped contractile clip, having superposed arms in parallel relation, one arm being shorter than the other, said shorter arm terminating in a reduced pointer and adjacent to and in yielding engagement with the longer arm and forming an acute angle therewith.

In testimony whereof I affix my signature.

RICHARD L. LLOYD.